United States Patent
Jin et al.

(10) Patent No.: US 8,916,643 B2
(45) Date of Patent: Dec. 23, 2014

(54) WATER-AND OIL-REPELLENT

(75) Inventors: Ji-Shan Jin, Ibaraki (JP); Satoshi Kurihara, Ibaraki (JP); Sumiko Mouri, Ibaraki (JP); Katsuyuki Sato, Ibaraki (JP)

(73) Assignee: Unimatec Co., Ltd., Toyko (JP)

( * ) Notice: Subject to any disclaimer, the term of this patent is extended or adjusted under 35 U.S.C. 154(b) by 0 days.

(21) Appl. No.: 13/088,697

(22) Filed: Apr. 18, 2011

(65) Prior Publication Data

US 2011/0257327 A1    Oct. 20, 2011

Related U.S. Application Data

(63) Continuation of application No. 12/682,617, filed as application No. PCT/JP2008/064278 on Aug. 8, 2008.

(30) Foreign Application Priority Data

Oct. 11, 2007  (JP) ................. 2007-265084
May 19, 2008  (JP) ................. 2008-130304

(51) Int. Cl.

| | |
|---|---|
| *D06M 15/277* | (2006.01) |
| *D06M 15/29* | (2006.01) |
| *D06M 15/248* | (2006.01) |
| *D06M 15/285* | (2006.01) |
| *D06M 15/263* | (2006.01) |
| *C08F 220/28* | (2006.01) |
| *C08F 220/18* | (2006.01) |
| *C08F 220/24* | (2006.01) |
| *C08F 220/26* | (2006.01) |

(52) U.S. Cl.
CPC ............ *D06M 15/248* (2013.01); *D06M 15/29* (2013.01); *C08F 2220/286* (2013.01); *D06M 15/277* (2013.01); *D06M 2200/10* (2013.01); *D06M 15/285* (2013.01); *C08F 220/18* (2013.01); *D06M 2200/12* (2013.01); *C08F 220/24* (2013.01); *C08F 220/26* (2013.01); *D06M 15/263* (2013.01); *D06M 2200/11* (2013.01)
USPC ........... 524/544; 524/558; 524/805; 526/245; 526/285; 526/287; 526/291; 526/320; 526/326; 526/343

(58) Field of Classification Search
CPC ...................................................... D06M 15/27

USPC .................. 524/544, 285, 287, 291; 526/245; 528/425; 560/102, 116, 126
See application file for complete search history.

(56) References Cited

U.S. PATENT DOCUMENTS

| | | | | |
|---|---|---|---|---|
| 4,127,711 | A * | 11/1978 | Lore et al. ..................... | 526/245 |
| 4,408,028 | A * | 10/1983 | Nakayama et al. ............ | 526/200 |
| 4,795,793 | A * | 1/1989 | Amimoto et al. .............. | 526/243 |
| 4,929,692 | A * | 5/1990 | Goldenberg .................... | 526/247 |
| 5,032,641 | A | 7/1991 | Nanishi et al. | |
| 6,121,372 | A * | 9/2000 | Yamamoto et al. ........... | 524/805 |
| 6,479,605 | B1 * | 11/2002 | Franchina ..................... | 526/245 |
| 6,593,408 | B1 * | 7/2003 | Takaki et al. ................. | 524/414 |
| 6,716,944 | B2 * | 4/2004 | Maekawa et al. ............. | 526/245 |
| 7,615,592 | B2 * | 11/2009 | Sagawa et al. ................ | 524/507 |
| 7,976,583 | B2 * | 7/2011 | Goetz et al. ................... | 8/115.51 |
| 2007/0015867 | A1 * | 1/2007 | Maekawa et al. ............. | 524/544 |
| 2007/0293654 | A1 | 12/2007 | Kashiwagi | |

FOREIGN PATENT DOCUMENTS

| | | | |
|---|---|---|---|
| CN | 1886481 | A | 12/2006 |
| EP | 1 632 542 | A1 | 3/2006 |
| JP | 02-008284 | | 1/1990 |
| JP | 02-008285 | | 1/1990 |
| JP | 05-247306 | | 9/1993 |
| JP | 05-272060 | | 10/1993 |
| JP | 09-291481 | | 11/1997 |
| JP | 11-080710 | | 3/1999 |
| JP | 2004-352976 | | 12/2004 |
| JP | 2005344032 | A * | 12/2005 |
| WO | WO 2004/035708 | | 4/2004 |
| WO | WO 2005/056711 | A1 | 6/2005 |
| WO | WO 2006/022122 | | 3/2006 |

OTHER PUBLICATIONS

International Search Report from corresponding PCT application No. PCT/JP2008/064278, dated Sep. 22, 2008, 4 pages.
Secchaku, *Technololgy on Adhesion & Sealing*, vol. 50, No. 5, p. 16-22, (2006).

\* cited by examiner

*Primary Examiner* — Nicole M Buie-Hatcher
(74) *Attorney, Agent, or Firm* — Brinks Gilson & Lione

(57) ABSTRACT

A water- and oil-repellent includes, as an active ingredient, a fluorine-containing copolymer including as a copolymer unit (A) at least one of perfluoroalkylalkyl acrylates and corresponding methacrylates, (B) benzyl acrylate or benzyl methacrylate represented by the general formula: $C_nF_{2n+1}C_mH_{2m}OCOCR{=}CH_2$ (wherein R represents a hydrogen atom or a methyl group; n represents 4, 5, or 6; and m represents 1, 2, 3, or 4), (C) a fluorine-free polymerizable monomer other than benzyl acrylate and benzyl methacrylate, and (D) a cross-linkable group-containing polymerizable monomer.

4 Claims, No Drawings

WATER-AND OIL-REPELLENT

RELATED APPLICATION

This application is a continuation application of U.S. patent application Ser. No. 12/682,617, filed Jul. 13, 2010 to which priority is claimed under 35 U.S.C. §120 and through which priority is claimed under 35 U.S.C. §120 to International Patent Application No. PCT/JP2008/064278, filed Aug. 8, 2008, and to which priority is claimed under 35 U.S.C. §119 to Japanese Patent Application Nos. 2007-265084, filed Oct. 11, 2007 and 2008-130304, filed May 19, 2008.

TECHNICAL FIELD

The present invention relates to a water- and oil-repellent. More specifically, the present invention relates to a water- and oil-repellent that allows water- and oil-repellent treatment at low curing temperature and imparts good textile feeling to a water- and oil-repellent-treated fabric.

BACKGROUND ART

The expression of water- and oil-repellency results from the low surface energy of fluorine, and, usually, fluorine-containing acrylate polymers are widely used as active ingredients of water- and oil-repellents. Previous various investigations have shown that the presence of crystallinity in a fluorine-containing polymer is necessary for expressing water- and oil-repellency in practical applications. In particular, it has been recognized that the hydrophobicity of a fluorine-containing polymer depends on the number of carbon atoms of a side-chain fluoroalkyl group and that the expression of crystallinity is observed when the number of carbon atoms is eight or more.
[Non-Patent Document 1] Secchaku (Adhesion), Vol. 50, No. 5, pp. 16-22 (2006)

Therefore, it has been regarded that a fluorine-containing polymer having a short fluoroalkyl group, i.e., a side-chain fluoroalkyl group having 7 or less, in particular, 6 or less carbon atoms, is low in or does not have crystallinity and thereby cannot provide water-repellent performance that is sufficieperformance that is sufficient for practical use. In addition, since water- and oil-repellents are required to have washing resistance and abrasion resistance, fluorine-containing acrylic polymers having long side chains are used.

However, polymers including a side-chain fluoroalkyl group having 8 or more carbon atoms are very hard due to their high crystallinity and have a problem that flexibility of textile products is impaired. Furthermore, since the water-repellent process needs high curing temperature, there are problems such as a change in color of fibers. In addition, since the polymers including a long side-chain fluoroalkyl group having 8 or more carbon atoms are excessively hydrophobic, a large amount of an emulsifier is necessary for producing a water- and oil-repellent.

The present applicant has before proposed a water- and oil-repellent composed of an aqueous emulsion in which a copolymer of a fluoroalkyl group-containing polymerizable monomer and vinylidene chloride or benzyl(meth)acrylate, and a carboxyl group-containing water-soluble polymer are dispersed in water using a nonionic surfactant. The fluoroalkyl group of a fluoroalkyl group-containing polymerizable monomer that is copolymerized with vinylidene chloride or benzyl(meth)acrylate is recognized to be a perfluoroalkyl group having 4 to 20 carbon atoms, but the perflucarbon atoms, but the perfluoroalkyl group used in the above-mentioned polymerization example is recognized to be a mixture of perfluoroalkyl groups having 6 to 14 carbon atoms, 9.0 on average.
[Patent Document 1] JP-A-11-80710

Accordingly, it is believed that a water- and oil-repellent showing excellent in flexibility and also excellent in washing resistance can be obtained if water- and oil-repellency can be expressed with a fluorine-containing polymer including a short side-chain fluoroalkyl group having 6 or less carbon atoms.

It has been also proposed a surface-treating agent showing excellent water repellency, oil repellency, and antifouling property by using a polymer having a short fluoroalkyl group having 1 to 6 carbon atoms as the side chain, but the fluoroalkyl group-containing monomer used therein is a fluorine-containing monomer compound represented by the general formula:

X: F, Cl, Br, I, $CFX^1X^2$, CN, a fluoroalkyl group having 1 to 20 carbon atoms, benzyl group, or phenyl group, Y: an aliphatic group having 1 to 10 carbon atoms, an aromatic or alicyclic group having 6 to 10 carbon atoms, a $CH_2CH_2NR^1SO_2$ group, or a $CH_2CH(OY^1)CH_2$ group, and Rf: a fluoroalkyl group having 1 to 6 carbon atoms.

Acrylic acid derivatives in which X is H are shown as comparative manufacturing examples, and methacrylic acid derivatives in which X is CH3 are intendedly excluded.
[Patent Document 2] JP-A-2004-352976

Furthermore, it has been proposed a water- and oil-repellent composition of which essential component is a copolymer containing as a polymerization unit (a) an Rf group-containing monomer of which homopolymer does not have a melting point derived from the Rf group in the microcrystals or has a melting point of 55° C. or less and has a glass transition point of 20° C. or more and (b) an Rf group-free monomer having a cross-linkable functional group, wherein the composition can impart excellent water- and oil-repellency to products, even in low temperature treatment, and also can perform a water- and oil-repellent process with providing soft textile feeling and also excellent durability.
[Patent Document 3] WO 2004/035708

In the above, a perfluoroalkylalkyl(meth)acrylate is used as the component monomer (a), but a specific monomer, such as a 2-butanone oxime adduct, pyrazole adduct, or ε-caprolactam adduct of a ω-isocyanate alkyl(meth)acrylate, is used as the component monomer (b) in the copolymerization reaction.

DISCLOSURE OF THE INVENTION

Problems to be Solved by the Invention

It is an object of the present invention to provide a water- and oil-repellent of which an active ingredient is a copolymer of a perfluoroalkylalkyl(meth)acrylate being low in bioaccumulation potential, wherein the copolymer is not that in which a specific monomer is copolymerized; the curing temperature in water- and oil-repellent treatment using the copolymer as an active ingredient is low; and a fabric treated with the water- and oil-repellent is imparted with excellent textile feeling.

Means for Solving the Problems

Such an object of the present invention is achieved by a water- and oil-repellent (herein after referred to as a first invention) including, as an active ingredient, a fluorine-containing copolymer including as a copolymerization unit, (A) at least one of perfluoroalkylalkyl acrylates and corresponding methacrylates represented by the general formula:

$$C_nF_{2n+1}C_mH_{2m}OCOCR=CH_2$$

(wherein R represents a hydrogen atom or a methyl group; n represents 4, 5, or 6; and m represents 1, 2, 3, or 4), (B) benzyl acrylate or benzyl methacrylate, (C) a fluorine-free polymerizable monomer other than benzyl acrylate and benzyl methacrylate, and (D) a cross-linkable group-containing polymerizable monomer, or achieved by a water- and oil-repellent (hereinafter referred to as a second invention) including, as an active ingredient, a fluorine-containing copolymer including as a copolymerization unit, (a) a perfluoroalkylalkyl acrylate represented by the general formula:

$$C_nF_{2n+1}C_mH_{2m}OCOCR=CH_2$$

(wherein n represents 4, 5, or 6; and m represents 1, 2, 3, or 4), (b) a perfluoroalkylalkyl methacrylate represented by the general formula:

$$C_nF_{2n+1}C_mH_{2m}OCOC(CH_3)=CH_2$$

(wherein n represents 4, 5, or 6; and m represents 1, 2, 3, or 4), (c) a fluorine-free polymerizable monomer, and (d) a cross-linkable group-containing polymerizable monomer.

Effect of the Invention

The water- and oil-repellent according to the present invention is a water- and oil-repellent of which an active ingredient is a copolymer of a perfluoroalkylalkyl(meth)acrylate being low in bioaccumulation potential, wherein the copolymer is not that in which a specific monomer is copolymerized; the curing temperature in water- and oil-repellent treatment using the copolymer as an active ingredient is low; and excellent textile feeling can be imparted to a water- and oil-repellent-treated fabric. In particular, regarding the textile feeling, it is recognized an advantageous effect that the fabric after the water- and oil-repellent treatment is not hardened, but instead is softened to improve the textile feeling. In addition, the water- and oil-repellent can impart sufficient water- and oil-repellency not only to synthetic fibers but also to natural fibers, and is also excellent in washing resistance When both the perfluoroalkylalkyl acrylate and the perfluoroalkylalkyl methacrylate are used, not only good water-repellency but also good oil-repellency can be obtained, Furthermore, in curing for cross-linking between a fabric and the water- and oil-repellent, when the cross-linking temperature for the curing is low, target performance cannot be obtained because of an insufficient reaction, a dropout of the polymer constituting the water- and oil-repellent and so on. Therefore, curing is usually performed under conditions such as at 180° C. for 1 minute or 170° C. for 1 or 2 minutes and is sometimes performed under conditions such as 160° C. for 3 minutes. In the water- and oil-repellent of the present invention, as shown in the below-described each Example, curing at a further lower temperature, at 150° C. for 3 minutes, is possible.

BEST EMBODIMENT FOR CARRYING OUT THE INVENTION

First, the copolymer unit of the first invention will be described.

Preferred examples of the component (A), perfluoroalkylalkyl(meth)acrylate, represented by the general formula:

$$C_nF_{2n+1}C_mH_{2m}OCOCR=CH_2$$

R: a hydrogen atom or a methyl group
n: 4, 5, or 6
m: 1, 2, 3, or 4
include the following compounds:

$$C_4F_9CH_2CH_2OCOCH=CH_2,$$

$$C_4F_9CH_2CH_2OCOC(CH_3)=CH_2,$$

$$C_6F_{13}CH_2CH_2OCOCH=CH_2, \text{ and}$$

$$C_6F_{13}CH_2CH_2OCOC(CH_3)=CH_2.$$

The component (A), perfluoroalkylalkyl(meth)acrylate, is supplied to a copolymerization reaction in such a ratio that its proportion in the resulting copolymer is about 10 to 80% by weight, preferably about 25 to 80% by weight, and more preferably about 40 to 80% by weight. By the copolymerization of such a monomer component (A), an aqueous dispersion showing excellent in emulsion stability can be formed, and water- and oil-repellency is expressed.

The component (B), benzyl acrylate or benzyl methacrylate, is supplied to the copolymerization reaction in such a ratio that its proportion in the resulting copolymer is about 5 to 80% by weight, preferably about 5 to 50% by weight, and more preferably about 5 to 35% by weight. By the copolymerization of the benzyl(meth)acrylate, the copolymer shows a good film-forming property and orientation.

As the component (C), fluorine-free polymerizable monomer, for example, at least one of vinylidene chlorides, alkyl (meth)acrylates including straight-chain or branched alkyl groups having 1 to 18 carbon atoms, cycloalkyl(meth)acrylates, alkoxyalkyl(meth)acrylates including alkoxyalkyl groups having 2 to 6 carbon atoms, monoalkyl esters or dialkyl esters of maleic acid or fumaric acid including an alkyl group having 1 to 8 carbon atoms, and vinyl esters such as vinyl acetate and vinyl caprylate is preferably used from the balance of water- and oil-repellency. In addition, another examples of the fluorine-free polymerizable monomer include copolymerizable vinyl compounds, such as styrene, methylstyrene, α-methylstyrene, vinylnaphthalene, (meth) acrylonitrile, acetone acrylamide, vinyl chloride, chloroethyl vinyl ether, a hydroxyalkyl vinyl ether including an alkyl group having 1 to 4 carbon atoms, polyethylene glycol mono (meth)acrylate, and polypropylene glycol mono(meth)acrylate. Furthermore, a diene compound such as isoprene, pentadiene, or butadiene can be copolymerized. In the first invention, the vinylidene chloride is preferably used.

The fluorine-free polymerizable monomer other than benzyl(meth)acrylates is supplied to the copolymerization reaction in such a ratio that its proportion in the resulting copolymer is about 5 to 80% by weight, preferably about 5 to 60% by weight, and more preferably about 5 to 40% by weight.

Examples of the component (D), cross-linkable group-containing polymerizable monomer, include epoxy group-containing monomers such as allyl glycidyl ether and glycidyl(meth)acrylate; N-methylol group-containing monomers such as N-methylol(meth)acrylamide and N-butoxymethylol(meth)acrylamide; hydroxyalkyl group-containing monomers such as 2-hydroxyethyl(meth)acrylate, 2-hydroxypropyl acrylate, 4-hydroxybutyl acrylate and 2-hydroxy-3-chloropropyl(meth)acrylate; amide group-containing monomers such as (meth)acrylamide, N-methyl acrylamide, diacetone acrylamide, and compounds represented by the formula:

$$CH_2=C(CH_3)CON.-N^+(CH_3)_2CH_2CH(OH)CH_3, \text{ or}$$

$$CH_2=C(CH_3)CON.-N^+(CH_3)_3;$$

aziridinyl group-containing monomers such as aziridinylethyl(meth)acrylate; and polyol poly(meth)acrylates such as ethylene glycol di(meth)acrylate, polyoxyethylene difmathracrylate, and polyoxypropylene glycol difinet.hlacrylate. Hydrophilic monomers are preferably used.

Further copolymerization of the cross-linkable group-containing polymerizable monomer strengthens the adhesion, to base materials such as fibers, of the fluorine-containing copolymer used as an active component for water- and oil-repellency; also shows an effect of improving, for example, the durability, washing resistance, and dry-cleaning resistance of the water- and oil-repellent; and also usually gives a secondary effect of improving the polymerization stability during emulsion polymerization. Therefore, the component (D) is used in such a ratio that its proportion in the copolymer is about 0.5 to 40% by weight and preferably about 1 to 15% by weight.

Next, the copolymerization units of the second invention will be described.

Preferable examples of the component (a), perfluoroalkylalkyl acrylate, represented by the general formula:

$$C_nF_{2n+1}C_mH_{2m}OCOCR=CH_2$$

n: 4, 5, or 6
m: 1, 2, 3, or 4
include the following compounds:

$$C_4F_9CH_2CH_2OCOCH=CH_2,$$

$$C_5F_{11}CH_2CH_2OCOCH=CH_2, \text{ and}$$

$$C_6F_{13}CH_2CH_2OCOCH=CH_2.$$

The component (a), perfluoroalkylalkyl acrylate, is supplied to a copolymerization reaction in such a ratio that its proportion in the resulting copolymer is about 1 to 80% by weight, preferably about 5 to 40% by weight, and more preferably about 8.5 to 20% by weight. By the copolymerization of such a monomer component (a), an aqueous dispersion showing excellent in emulsion stability can be formed, and water- and oil-repellency is expressed.

The preferable examples of the component (b), perfluoroalkylalkyl methacrylate, represented by the general formula:

$$C_nF_{2n+1}C_mH_{2m}OCOC(CH_3)=CH_2$$

n: 4, 5, or 6
m: 1, 2, 3, or 4
include the following compounds:

$$C_4F_9CH_2CH_2OCOC(CH_3)=CH_2,$$

$$C_5F_{11}CH_2CH_2OCOC(CH_3)=CH_2, \text{ and}$$

$$C_6F_{13}CH_2CH_2OCOC(CH_3)=CH_2$$

The component (b), perfluoroalkylalkyl methacrylate, is supplied to the copolymerization reaction in such a ratio that its proportion in the resulting copolymer is about 10 to 80% by weight, preferably about 25 to 80% by weight, and more preferably about 35 to 60% by weight. By the copolymerization of such a monomer component (b) to the component (a), an aqueous dispersion showing excellent in emulsion stability can be formed, and further excellent water-repellency and oil, repellency are expressed.

The various types of the fluorine-free polymerizable monomers shown in the first invention are used as the fluorine-free polymerizable monomer of the component (c), and at least one of vinylidene chlorides, stearyl acrylates, stearyl methacrylates, benzyl acrylates, and benzyl methacrylates is preferably used. The component (c), fluorine-free polymerizable monomer, is supplied to the copolymerization reaction in such a ratio that its proportion in the copolymer is about 5 to 80% by weight, preferably about 5 to 60% by weight, and more preferably about 5 to 40% by weight.

Furthermore, examples of the component (d), cross-linkable group-containing polymerizable monomer, include the same cross-linkable group-containing polymerizable monomers shown in the first invention, and hydrophilic monomers are preferably used.

Further copolymerization of the cross-linkable group-containing polymerizable monomer strengthens the adhesion, to base materials such as fibers, of the fluorine-containing copolymer used as an active component for water- and oil-repellency; also shows an effect of improving, for example, the durability, washing resistance, and dry-cleaning resistance of the water- and oil-repellent; and also usually gives a secondary effect of improving the polymerization stability during emulsion polymerization. Therefore, the component (d) is used in such a ratio that its proportion in the copolymer is about 0.5 to 40% by weight and preferably about 1 to 15% by weight.

Furthermore, since the copolymerization reaction is performed at a polymerization ratio of 90% or more, the weight ratios of copolymerized monomers in the copolymer approximately agree with the weight ratios of monomers charged for the copolymerization.

In both the first invention and the second invention, the copolymerization reaction using these polymerizable monomers is performed by emulsion polymerization in the presence of a surface-active emulsifier composed of a polyethylene oxide adduct type nonionic surfactant or of both said nonionic surfactant and a polyethylene oxide adduct type cationic surfactant and in the presence of an emulsifying aid composed of a glycol-based compound. The ratio of the surface-active emulsifier is about 1 to 20% by weight and preferably about 1 to 10% by weight, and the ratio of the emulsifying aid is about 10 to 100% by weight and preferably about 15 to 70% by weight, based on the total amount of the monomers for the copolymerization.

As such a cationic surfactant, a polyethylene oxide adduct of a quaternary ammonium-based surfactant, for example, an alkylammonium chloride or alkylpyridinium salt having 1 to 3 polyoxyethylene groups, is used. On this occasion, a cationic surfactant without the polyethylene oxide, for example, a quaternary ammonium-based surfactant, can be simultaneously used. In such a case, the weight ratio is preferably about 0.1 to 2 to the polyethylene oxide adduct type.

In addition, as the polyethylene oxide adduct type nonionic surfactant, for example, a reaction product of a polyethylene oxide with an alcohol such as an aliphatic alcohol or an aromatic alcohol, an alkyl ether, oleic acid, a C.sub.12 to C.sub.18 alkylamine, or sorbitan mono fatty acid is used in a ratio of about 80% by weight or less and preferably about 30 to 80% by weight in the total amount with the polyethylene oxide adduct type cationic surfactant.

Here, instead of the cationic surfactant, those in which an amine compound having a polyethylene oxide chain, for example, a polyoxyethylene octadecylamine (such as Amiet•320, a Kao product), a polyoxyethylene alkyldiamine (such as Esoduomin T/25, a Lion product) represented by the general formula:

(CH$_2$CH$_2$O)$_z$H, or a polyoxyethylene dodecylamine (such as Nymeen L-207, a NOF product) is neutralized with an organic acid such as acetic acid can be used.

Examples of the glycol compound as the emulsifying aid used in a combination with the emulsifier include ethylene glycol, polyethylene (n=2 to 4 or more) glycol, propylene glycol, polypropylene (n=2 to 4 or more) glycol, their terminal monomethyl ethers, hexylene glycol, and propylene glycol adducts of glycerin. A polypropylene glycol-based compound having a molecular weight of about 300 to 3000 or hexylene glycol is preferably used.

Prior to the copolymerization reaction, a polymerizable monomer mixture containing a perfluoroalkylalkyl(meth) acrylate and another polymerizable monomer is subjected to emulsification treatment in the presence of a surface-active emulsifier and an emulsifying aid. The emulsification treatment is sufficiently carried out using a high-pressure homogenizer or the like.

The copolymerization reaction of the emulsified polymerizable monomer mixture is performed in the presence of a radical polymerization initiator added to the reaction system. The radical polymerization initiator may be any of organic peroxides, azo compounds, and persulfates. Preferably, a water-soluble azo compound for example, 2,2'-azobis(2-amidinopropane).dihydrochloride, is used in a ratio of about 0.1 to 10% by weight and preferably about 0.5 to 7% by weight to the total weight of the polymerizable monomer mixture.

The copolymerization reaction is carried out in an aqueous solvent at about 40 to 80° C. for about 1 to 10 hours to form an aqueous dispersion (aqueous emulsion) serving as a stock solution having a solid content concentration of about 15 to 35% by weight. As the aqueous solvent, in addition to the use of water alone, preferably used an aqueous solvents containing about 1 to 30% by weight of a water-soluble organic solvent, for example, a ketone such as acetone or methyl ethyl ketone, an alcohol such as methanol or ethanol, or a glycol such as ethylene glycol, propylene glycol, dipropylene glycol, a monomethyl ether thereof, or a tripropylene glycol. In the reaction, a molecular weight modifier may be used, and, for example, an alkyl mercaptan such as n-octyl mercaptan, n-dodecyl mercaptan, or tertiary dodecyl mercaptan is preferably used.

The thus obtained aqueous dispersion as the stock solution is diluted with water, preferably with ion-exchanged water to give a solid content concentration of about 0.1 to 10% by weight, and then is effectively applied, as a water- and oil-repellent, to, for example, fibers, a fabric, a woven fabric, paper, a film, a carpet, or a fabric product made of filaments, threads, or fibers. The application is performed by coating, dipping, spraying, padding, roll coating, or a combination thereof. For example, a bath containing a solid content in a concentration of about 0.1 to 10% by weight is used as a pad bath. A material to be treated is padded in this pad bath and is then subjected to removal of excessive liquid with a squeezing roller, followed by drying, thereby allowing the fluorine-containing copolymer to adhere to the material to be treated in a ratio of about 0.01 to 10% by weight to the amount of the material. Subsequently, drying, which varies depending on the type of the material to be treated, is usually conducted at about 80 to 120° C. for about from 1 minute to 2 hours, and then curing is performed under low curing temperature conditions of at 150 to 180° C. for about 1 to 3 minutes, preferably at about 150 to 170° C. for about 1 to 3 minutes, and particularly preferably at 150° C. for 3 minutes to complete the water' and oil-repellent treatment.

EXAMPLES

Next, the present invention will be described with reference to Examples. Note that percentage in parentheses means % by weight.

Example 1

| | |
|---|---|
| 2'(n-Perfluorohexylrethyl methacrylate | 78.5 g (61.6%) |
| Benzyl methacrylate | 22.4 g (17.6%) |
| 2-Hydroxyethyl methacrylate | 5.6 g (4.4%) |
| Polyethylene glycol (n = 4) mono methacrylate (PE-200, a NOF product) | 4.2 g (3.3%) |
| Lauryl mercaptan (chain transfer agent) | 0.5 g |
| Polyoxyethylene polycyclic phenyl ether (surfactant) (Newcol-740, a Nippon Nyukazai product) | 7.0 g |
| Acetone (solvent) | 76.7 g |
| Ion-exchanged water | 225.8 g |

The above-mentioned components were put in a 1-L glass reaction vessel and were mixed, and further subjected to emulsification mixing using a high-pressure homogenizer. The resulting emulsion was substituted by nitrogen gas for 30 minutes. Then, the inner temperature of the reaction vessel" was gradually increased to 40° C., and then

| | |
|---|---|
| vinylidene chloride | 11.2 g (8.8%) |
| N-methylol acrylamide (dissolved in 29.3 g of ion-exchanged water) | 5.6 g (4.4%) |
| 2,2'-azobis(2-amidinopropane) dihydrochloride (dissolved in 30.4 g of ion-exchanged water) | 2.8 g | were added thereto (the total amount including 285.5 g of total ion-exchanged water was 500.0 g). Furthermore, the inner temperature was gradually increased to 70° C., followed by the reaction at the temperature for 4 hours. After the completion of the reaction and cooling, an aqueous dispersion having a solid content concentration of 25.2% by weight was obtained. The melting point (DSC method) of the copolymer separated from the aqueous dispersion was 44° C.

The thus obtained aqueous dispersion was diluted with ion-exchanged water to a solid content concentration of 0.5% by weight, and a cotton fabric, a cotton/polyester blended fabric, a polyester fabric, or a nylon fabric was immersed therein for measuring water-repellency (according to JIS L1092) and oil-repellency (according to AATCC-TM118-1992). The wet pick-ups after squeezing were 100% for the cotton fabric and the cotton blended fabric, 40% for the polyester fabric, and 60% for the nylon fabric. The drying conditions were 80° C. for 10 minutes, and the curing conditions were 150° C. for 3 minutes, for all the fabrics.

The evaluation criteria for water-repellency were defined in conformity with the rules of the above-mentioned JIS.

| Degree of water-repellency | Condition |
|---|---|
| 100 | Showing no wet state and adhesion of water droplets on the surface |

-continued

| Degree of water-repellency | Condition |
|---|---|
| 90 | Showing little adhesion of water droplets on the surface |
| 80 | Partially showing separate wet state on the surface |
| 70 | Showing wet state on a half area of the surface |
| 50 | Showing wet state on the entire surface |
| 0 | Showing complete wet state on both surfaces |

The evaluation criteria for oil-repellency were defined in conformity with the rules of the above-mentioned AATCC. A drop of a test solution was dropped onto an oil-repellent treated fabric, and conditions at 30 seconds after the dropping were investigated. When the test solution dropped was held on the fabric, a test using a test solution having a larger number was further conducted. The oil-repellency was evaluated with the test solution that was the limit for being held on the fabric and on the basis of the oil-repellency evaluation shown in the following table (when Nujol is not held at all (100%), it is defined 0).

| Oil-repellency No. | Test solution | Surface tension (mN/m. 25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | Nujol/n-hexadecane (volume ratio: 65%:35%) | 29.6 |
| 1 | Nujol | 31.2 |

In addition, textile feeling was evaluated by touching and evaluated at the following four grades:
⊙: very soft
O: soft
Δ: the same as or slightly harder than the original fabric
x: harder than the original fabric

Example 2

In Example 1, a copolymerization reaction was performed using the same amount of 2-(n-perfluorobutyl)ethyl methacrylate instead of the 2-(n-perfluorohexyl)ethyl methacrylate. The resulting diluted aqueous dispersion was subjected to water-repellency and oil-repellency tests and was evaluated for textile feeling.

Example 3

In Example 1, a copolymerization reaction was performed using the same amount of 2-(n-perfluorohexyl)ethyl acrylate instead of the 2-(n-perfluorohexyl)ethyl methacrylate. The resulting diluted aqueous dispersion was subjected to water-repellency and oil-repellency tests and was evaluated for textile feeling.

Example 4

In Example 1, a copolymerization reaction was performed using the same amount of 2-(n-perfluorobutyl)ethyl acrylate instead of the 2-(n-perfluorohexyl)ethyl methacrylate. The resulting diluted aqueous dispersion was subjected to water-repellency and oil-repellency tests and was evaluated for textile feeling.

Example 5

In Example 1, a copolymerization reaction was performed using 35.0 g of hexylene glycol as an emulsifying aid, not using acetone, and changing the total amount of ion-exchanged water to 327.2 g. The resulting diluted aqueous dispersion was subjected to water-repellency and oil-repellency tests and was evaluated for textile feeling.

Example 6

In Example 1, a copolymerization reaction was performed by changing the component amounts of the following components in the copolymerizing monomers charged for the copolymerization reaction as follows:

| | |
|---|---|
| 2-(n-perfluorohexyl·ethyl methacrylate | 87.2 g (64.0%) |
| benzyl methacrylate | 22.4 g (16.4%) |
| 2-hydroxyethyl methacrylate | 5.6 g (4.1%) |
| polyethylene glycol (n = 4) mono methacrylate | 4.2 g (3.1%) |
| vinylidene chloride | 11.2 g (8.2%) |
| N-methylol acrylamide | 5.6 g (4.1%) | and the resulting diluted aqueous dispersion was subjected to water-repellency and oil-repellency tests and was evaluated for textile feeling. In addition, 35.0 g of hexylene glycol was used as an emulsifying aid, acetone was not used, and the total amount of ion-exchanged water was changed to 318.5 g.

Example 7

In Example 1, a copolymerization reaction was performed by changing the component amounts of the following components in the copolymerizing monomers charged for the copolymerization reaction as follows (provided that N-methylol methacrylamide was used instead of N-methylol acrylamide):

| | |
|---|---|
| 2-(n-perfluorohexyl)ethyl methacrylate | 100.6 g (79.1%) |
| benzyl methacrylate | 7.4 g (5.8%) |
| 2-hydroxyethyl methacrylate | 5.6 g (4.4%) |
| polyethylene glycol (n = 4) mono methacrylate | 4.2 g (3.3%) |
| vinylidene chloride | 3.8 g (3.0%) |
| N-methylol methacrylamide | 5.6 g (4.4%) | and the resulting diluted aqueous dispersion was subjected to water-repellency and oil-repellency tests and was evaluated for textile feeling. In addition, 35.0 g of hexylene glycol was used as an emulsifying aid, acetone was not used, and the total amount of ion-exchanged water was changed to 327.5 g.

Example 8

In Example 1, a copolymerization reaction was performed by changing the component amounts of the following components in the copolymerizing monomers charged for the copolymerization reaction as follows:

| | |
|---|---|
| 2-(n-perfluorohexyl)ethyl methacrylate | 58.3 g (45.6%) |
| benzyl methacrylate | 29.2 g (22.8%) |

-continued

| 2-hydroxy ethyl methacrylate | 5.6 g (4.4%) |
|---|---|
| polyethylene glycol (n = 4) mono methacrylate | 11.7 g (9.1%) |
| vinylidene chloride | 17.5 g (13.7%) |
| N-methylol acrylamide | 5.6 g (4.4%) | and the resulting diluted aqueous dispersion was subjected to water-repellency and oil-repellency tests and was evaluated for textile feeling. In addition, 35.0 g of hexylene glycol was used as an emulsifying aid, acetone was not used, and the total amount of ion-exchanged water was changed to 326.8 g.

Example 9

In Example 5, a copolymerization reaction was performed by changing the kind and the amount of the component (A), perfluoroalkylalkyl(meth)acrylate, in the copolymerizing monomers charged for the copolymerization reaction as follows:

| (a) 2-(n-perfluorohexyl)ethyl acrylate | 7.9 g (6.2%) |
|---|---|
| (b) 2-(n-perfluorohexyl)ethyl methacrylate | 70.6 g (55.4%) | and the resulting diluted aqueous dispersion was subjected to water-repellency and oil-repellency tests and was evaluated for textile feeling.

Example 10

In Example 5, a copolymerization reaction was performed by changing the kind and the amount of the component (A), perfluoroalkylalkyl(meth)acrylate, in the copolymerizing monomers charged for the copolymerization reaction as follows:

| (a) 2-(n-perfluorohexyl)ethyl acrylate | 15.7 g (12.3%) |
|---|---|
| (b) 2-(n-perfluorohexyl)ethyl methacrylate | 62.8 g (49.3%) | and the resulting diluted aqueous dispersion was subjected to water-repellency and oil-repellency tests and was evaluated for textile feeling.

Example 11

In Example 5, a copolymerization reaction was performed by changing the kind and the amount of the component (A), perfluoroalkylalkyl(meth)acrylate, in the copolymerizing monomers charged for the copolymerization reaction as follows:

| (a) 2-(n-perfluorohexyl)ethyl acrylate | 23.6 g (18.5%) |
|---|---|
| (b) 2-(n-perfluorohexyl)ethyl methacrylate | 54.9 g (43.1%) | and the resulting diluted aqueous dispersion was subjected to water-repellency and oil-repellency tests and was evaluated for textile feeling.

Comparative Example 1

In Example 1, a copolymerization reaction was performed by using the same amount (the same ratio) of 2-(perfluoroalkyl)ethyl methacrylate (perfluoroalkyl group being a group mixture of $C_6$: 6%, $C_8$: 52%, $C_{10}$: 24%, $C_{12}$: 7%, $C_{14}$: 2%, and total: 91%, and having an average number of carbon atoms of 8.8) instead of the 2-(n-perfluorohexyl)ethyl methacrylate in the materials charged for the copolymerization reaction, and the resulting diluted aqueous dispersion was subjected to water-repellency and oil-repellency tests and was evaluated for textile feeling.

Table 1 shows the results of Examples 1 to 11 and Comparative Example 1. The melting point (DSC method) of each of the resulting copolymers is also shown in the table. Regarding the water-repellency and the oil-repellency, the evaluation results thereof are shown in the form of water-repellency evaluation/oil repellency evaluation.

TABLE 1

| | Melting | Water-repellency evaluation/Oil-repellency evaluation | | | | |
|---|---|---|---|---|---|---|
| Example | point (° C.) | Cotton fabric | Blended fabric | Polyester fabric | Nylon fabric | Textile feeling |
| Example 1 | 44 | 100/3 | 100/5 | 100/5 | 100/6 | ◯ |
| Example 2 | | 70/4 | 80/4 | 70/4 | 100/4 | ◯ |
| Example 3 | 44 | 70/6 | 80/6 | 70/6 | 70/6 | ◯ |
| Example 4 | | 70/4 | 50/4 | 70/4 | 70/5 | ◯ |
| Example 5 | 45 | 100/3 | 100/5 | 100/5 | 100/6 | ◯ |
| Example 6 | 45 | 100/4 | 100/5 | 100/5 | 100/6 | ⊙ |
| Example 7 | 46 | 100/5 | 100/5 | 100/6 | 100/6 | ⊙ |
| Example 8 | 45 | 100/1 | 100/4 | 100/4 | 100/5 | ◯ |
| Example 9 | 44 | 100/4 | 100/5 | 100/6 | 100/6 | ⊙ |
| Example 10 | 44 | 100/5 | 100/5 | 100/6 | 100/6 | ⊙ |
| Example 11 | 43 | 100/5 | 100/5 | 100/6 | 100/6 | ◯ |
| Compo Ex. 1 | 84 | 100/5 | 100/6 | 100/6 | 100/6 | △ |

Example 12

| 2-(n-Perfluorohexyl) ethyl acrylate | 13.4 g (9.1%) |
|---|---|
| 2-(n-Perfluorohexyl)ethyl methacrylate | 53.4 g (36.4%) |
| Stearyl acrylate | 74.2 g (50.5%) |
| Lauryl mercaptan | 0.5 g |
| Stearyltrimethyl ammonium chloride (surfactant) | 7.8 g |
| Polyoxyethylene polycyclic phenyl ether (Newcol-740) | 9.2 g |
| Polypropylene glycol (Uniol D-400, a NOF product, molecular weight: 400) | 28.5 g |
| Ion-exchanged water | 244.1 g |

The above-mentioned components were put in a 1-L glass reaction vessel and were mixed and further subjected to emulsification mixing using a high-pressure homogenizer. The resulting emulsion was substituted by nitrogen gas for 30 minutes. Then, the inner temperature of the reaction vessel was gradually increased to 40° C., and then

| N-methylol acrylamide (dissolved in 30 g of ion-exchanged water) | 5.9 g (4.0%) |
|---|---|
| 2,2'-azobis(2-amidinopropane) dihydrochloride (dissolved in 30 g of ion-exchanged water) | 3.0 g | were added thereto (the total amount including 304.1 g of total ion-exchanged water was 500.0 g). Furthermore, the inner temperature was gradually increased to 70° C., followed by the reaction at the temperature for 4 hours. After the completion of the reaction and cooling, an aqueous dispersion having a solid content concentration of 32.8% by weight was obtained. The resulting aqueous dispersion was subjected to water-repellency and oil-repellency tests and was evaluated for textile feeling, as in Example 1.

Example 13

| | |
|---|---|
| 2-(n-Perfluorohexyl)ethyl acrylate | 13.4 g (8.9%) |
| 2-(n-Perfluorohexyl)ethyl methacrylate | 53.4 g (35.4%) |
| Stearyl acrylate | 41.2 g (27.3%) |
| Stearyl methacrylate | 33.1 g (21.9%) |
| Lauryl mercaptan | 0.5 g |
| Stearyltrimethyl ammonium chloride | 3.7 g |
| Distearyldimethyl ammonium chloride (surfactant) | 8.7 g |
| Polyoxyethylene polycyclic phenyl ether (Newcol-740) | 7.5 g |
| Polypropylene glycol (Uniol D-400, molecular weight: 400) | 38.4 g |
| Ion-exchanged water | 197.3 g |

The above-mentioned components were put in a 1-L glass reaction vessel and were mixed and further subjected to emulsification mixing using a high-pressure homogenizer. The resulting emulsion was substituted by nitrogen gas for 30 minutes. Then, the inner temperature of the reaction vessel was gradually increased to 40° C., and then

| | |
|---|---|
| acrylamide (dissolved in 30 g of ion-exchanged water) | 3.9 g (2.6%) |
| N-methylol acrylamide (dissolved in 30 g of ion-exchanged water) | 5.9 g (3.9%) |
| 2,2'-azobis(2-amidinopropane) dihydrochloride (dissolved in 30 g of ion-exchanged water) | 3.0 g | were added thereto (the total amount including 287.3 g of total ion-exchanged water was 500.0 g). Furthermore, the inner temperature was gradually increased to 70° C., followed by the reaction at the temperature for 4 hours. After the completion of the reaction and cooling, an aqueous dispersion having a solid content concentration of 34.9% by weight was obtained. The resulting aqueous dispersion was subjected to water-repellency and oil-repellency tests and was evaluated for textile feeling, as in Example 1.

Example 14

In Example 12, a copolymerization reaction was conducted by using 24.5 g (16.7%) of benzyl methacrylate and 49.7 g (33.8%) of 2-ethylhexyl methacrylate instead of the stearyl acrylate, and changing the amount of the stearyltrimethyl ammonium chloride to 3.7 g, the amount of the polyoxyethylene polycyclic phenyl ether to 7.5 g, the amount of the polypropylene glycol to 38.4 g, and the total amount of ion-exchanged water to 300 g, respectively. The resulting aqueous dispersion was subjected to water-repellency and oil-repellency tests and was evaluated for textile feeling.

Example 15

| | |
|---|---|
| 2-(n-Perfluorohexyl)ethyl acrylate | 13.4 g (9.1%) |
| 2-(n-Perfluorohexy)ethyl methacrylate | 53.4 g (36.4%) |
| Stearyl acrylate | 41.1 g (28.0%) |
| Stearyl methacrylate | 8.6 g (5.9%) |
| Benzyl methacrylate | 4.5 g (16.7%) |
| Lauryl mercaptan | 0.5 g |
| Stearyltrimethyl ammonium chloride | 7.8 g |
| Polyoxyethylene polycyclic phenyl ether (Newcol-740) | 7.5 g |
| Polypropylene glycol (Uniol D-400, molecular weight: 400) | 19.2 g |
| Hexylene glycol (solvent) | 19.2 g |
| Ion-exchanged water | 205.9 g |

The above-mentioned components were put in a 1-L glass reaction vessel and were mixed and further subjected to emulsification mixing using a high-pressure homogenizer. The resulting emulsion was substituted by nitrogen gas for 30 minutes. Then, the inner temperature of the reaction vessel was gradually increased to 40° C., and then

| | |
|---|---|
| 2-hydroxyethyl methacrylate (dissolved in 30 g of ion-exchanged water) | 2.8 g (1.9%) |
| N-methylol acrylamide (dissolved in 30 g of ion-exchanged water) | 3.1 g (2.1%) |
| 2,2'-azobis(2-amidinopropane) dihydrochloride (dissolved in 30 g of ion-exchanged water) | 3.0 g | were added thereto (the total amount including 295.9 g of total ion-exchanged water was 500.0 g). Furthermore, the inner temperature was gradually increased to 70° C., followed by the reaction at the temperature for 4 hours. After the completion of the reaction and cooling, an aqueous dispersion having a solid content concentration of 32.0% by weight was obtained. The resulting aqueous dispersion was subjected to water-repellency and oil-repellency tests and was evaluated for textile feeling, as in Example 1.

Example 16

| | |
|---|---|
| 2-(n-Perfluorohexyl)ethyl acrylate | 15.7 g (10.7%) |
| 2-(n-Perfluorohexyl)ethyl methacrylate | 62.9 g (42.8%) |
| Stearyl acrylate | 21.5 g (14.6%) |
| Benzyl methacrylate | 12.5 g (8.5%) |
| 2-Ethylhexyl methacrylate | 28.8 g (19.6%) |
| Lauryl mercaptan | 0.5 g |
| Stearyltrimethyl ammonium chloride | 3.7 g |
| Polyoxyethylene polycyclic phenyl ether (Newcol-740) | 7.5 g |
| Hexylene glycol | 38.4 g |
| Ion-exchanged water | 210.0 g |

The above-mentioned components were put in a 1-L glass reaction vessel and were mixed and further subjected to emulsification mixing using a high-pressure homogenizer. The resulting emulsion was substituted by nitrogen gas for 30 minutes. Then, the inner temperature of the reaction vessel was gradually increased to 40° C., and then

| | |
|---|---|
| 2-hydroxyethyl methacrylate (dissolved in 30 g of ion-exchanged water) | 2.8 g (1.9%) |
| N-methylol acrylamide (dissolved in 30 g of ion-exchanged water) | 2.8 g (1.9%) |
| 2,2'-azobis(2-amidinopropane) dihydrochloride (dissolved in 30 g of ion-exchanged water) | 3.0 g | were added thereto (the total amount including 300.0 g of total ion-exchanged water was 500.0 g). Furthermore, the inner temperature was gradually increased to 70° C., followed by the reaction at the temperature for 4 hours. After the completion of the reaction and cooling, an aqueous dispersion having a solid content concentration of 30.0% by weight was obtained. The resulting aqueous dispersion was subjected to water-repellency and oil-repellency tests and was evaluated for textile feeling, as in Example 1.

Comparative Example 2

In Example 12, an aqueous dispersion obtained by not using 2-(n-perfluorohexyl)ethyl acrylate and changing the amount of 2-(n-perfluorohexyl)ethyl methacrylate to 66.8 g (45.5%) was subjected to water-repellency and oil-repellency tests and was evaluated for textile feeling, as in Example 1.

Comparative Example 3

In Example 12, an aqueous dispersion obtained by not using 2-(n-perfluorohexyl)ethyl methacrylate and changing the amount of 2-(n-perfluorohexyl)ethyl acrylate to 66.8 g (45.5%) was subjected to water-repellency and oil-repellency tests and was evaluated for textile feeling, as in Example 1.

Table 2 shows the results of Examples 12 to 16 and Comparative Examples 2 and 3. Regarding the water-repellency and the oil-repellency, the evaluation results thereof are shown in the form of water repellency evaluation/oil repellency evaluation.

TABLE 2

| Example | Water-repellency evaluation/Oil-repellency evaluation | | | | |
|---|---|---|---|---|---|
| | Cotton fabric | Blended fabric | Polyester fabric | Nylon fabric | Textile feeling |
| Example 12 | 100/4 | 100/5 | 10016 | 10016 | ⊙ |
| Example 13 | 100/4 | 100/5 | 10016 | 10016 | ⊙ |
| Example 14 | 100/4 | 100/5 | 10016 | 10016 | ○ |
| Example 15 | 100/4 | 100/5 | 10016 | 10016 | ⊙ |
| Example 16 | 100/5 | 100/5 | 10016 | 10016 | ○ |
| Compo Ex. 2 | 100/2 | 100/3 | 100/4 | 100/4 | ⊙ |
| Compo Ex. 3 | 70/5 | 70/6 | 80/6 | 80/7 | ⊙ |

The invention claimed is:

1. A water- and oil-repellent comprising an aqueous emulsion dispersed fluorine-containing copolymer having as a copolymerization composition:
(A) 61.6 to 80 wt. % of perfluoroalkylalkyl methacrylates represented by the general formula:

$$C_6F_{13}C_mH_{2m}OCOCCH_3=CH_2$$

wherein m represents 1, 2, 3, or 4,
(B) 5 to 32.9 wt. % of at least one of benzyl acrylate and benzyl methacrylate,
(C) 5 to 32.9 wt. % of (i) vinylidene chloride together with at least one of (ii) polyethylene glycol monoacrylate and polyethylene glycol monomethacrylate, and
(D) 0.5 to 28.4 wt. % of a cross-linkable group-containing polymerizable monomer,
into water in the presence of a surfactant consisting of a polyoxyethylene polycyclic phenyl ether.

2. A water- and oil-repellent according to claim 1, wherein the component (D), cross-linkable group-containing polymerizable monomer, of the fluorine-containing copolymer is a hydrophilic monomer.

3. A water- and oil-repellent according to claim 1, wherein the fluorine-containing copolymer has a copolymerization composition comprising 64 to 80% by weight of the component (A), 5 to 32.9 by weight of component (b), 5 to 32.9% by weight of the component (C), and 0.5 to 28.4% by weight of the component (D).

4. A water- and oil-repellent according to claim 1, enabling curing under curing conditions of 150° C. for 3 minutes.

* * * * *